Figure 1:
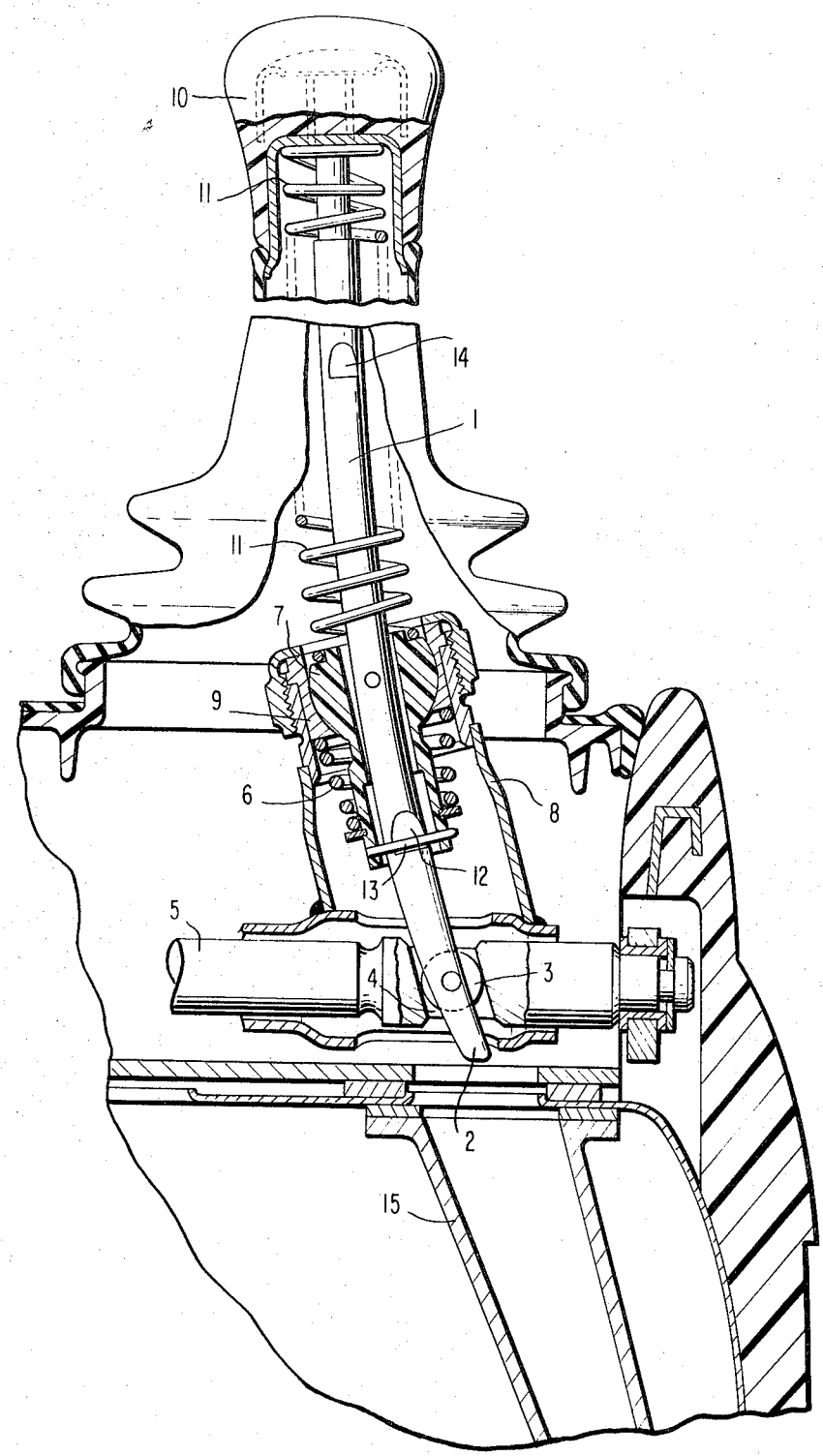

United States Patent [19]

Albrecht

[11] 3,757,599

[45] Sept. 11, 1973

[54] SHIFTING LEVER FOR MOTOR VEHICLE TRANSMISSIONS

[75] Inventor: Wilhelm Albrecht, Vaihingen (Enz), Germany

[73] Assignee: Daimler-Benz Aktiengesellschaft, Stuttgart-Unterturkheim, Germany

[22] Filed: Nov. 19, 1971

[21] Appl. No.: 200,496

[30] Foreign Application Priority Data

Nov. 21, 1970 Germany.................. P 20 57 311.9

[52] U.S. Cl. ................................................. 74/473
[51] Int. Cl............................................. G05g 9/00
[58] Field of Search ..................................... 74/473

[56] References Cited
UNITED STATES PATENTS

| | | | |
|---|---|---|---|
| 3,561,281 | 2/1971 | Wilfert.................................. | 74/473 |
| 2,197,938 | 4/1940 | Lapsley et al........................ | 74/473 |
| 3,180,175 | 4/1965 | Brook................................... | 74/473 |
| 3,264,893 | 8/1966 | Stott et al. .......................... | 74/473 |

Primary Examiner—Manuel A. Antonakas
Assistant Examiner—Wesley S. Ratliff, Jr.
Attorney—Craig, Antonelli & Hill

[57] ABSTRACT

A shifting lever, especially a center shifting lever for the transmission of vehicles disengageably connected with the shifting linkage leading to the transmission and/or a fixed vehicle part by application of axial pressure forces that are larger than the forces necessary for the shifting of the transmission. The shifting lever after the disengagement is displaceable in the axial direction against the force of a compression spring. Upon application of a predetermined tensional force the shifting lever may be brought back to its normal operating position.

17 Claims, 2 Drawing Figures

SHIFTING LEVER FOR MOTOR VEHICLE TRANSMISSIONS

The present invention relates to a shifting lever, especially a center shifting lever for the transmissions of motor vehicles, which is so connected with the shifting linkage leading to the transmission and/or a fixed vehicle part that the connection disengages under the influence of essentially axial pressure forces that are larger than the forces necessary for the shifting of the transmission, and the shifting lever is displaceable in the axial direction after the disengagement of this connection, as described in U.S. Pat. No. 3,707,095.

It is known that in case of accidents considerable internal injuries of the vehicle passengers can be caused by the customary transmission shifting levers which are non-yielding in the axial direction.

In order to eliminate this danger, a shifting lever has been proposed in the aforementioned United States Patent which is able to deflect in the axial direction in case of an impact of a vehicle passenger.

The present invention is concerned with the task to provide a shifting lever of the aforementioned type which satisfies both the safety requirements as also offers special assistance during the operation of the vehicle.

A shifting lever, especially a center, floor-type shifting lever for the transmission of motor vehicles, is therefore proposed which is so connected with the shifting linkage leading to the transmission and/or a fixed vehicle part, that the connection releases under the influence of essentially axial pressure forces that are larger than the forces necessary for the shifting of the transmission, and the shifting lever is displaceable in the axial direction after the disengagement or release of this connection whereby according to the present invention the shifting lever is displaceable after the release of the connection against the force of a pressure spring.

Such a shifting lever should thereby preferably be adapted to be stopped in an inserted end position.

For example, the advantage is achieved thereby that the shifting lever can be pressed into its lower end position and can be kept thereat when a vehicle passenger steps from one vehicle side to the other, whereby the handle portion of the shifting lever can terminate, for example, with the upper edge of the seat cushion. The pressure spring should thereby be so designed and dimensioned that the shifting lever after the release from its lower end position, returns automatically relatively slowly into its normal operating position, i.e., that the pressure spring should not cause a rapid upward movement or snapping of the shifting lever.

According to a preferred embodiment of the present invention, a spring is provided engaging into notches in the shifting lever for retaining the shifting lever in its upper and lower end position.

In order to prevent a rotation of the shifting lever, the latter can be made advantageously of a flat section or profile.

Accordingly, it is an object of the present invention to provide a shifting lever for vehicle transmissions which avoids the aforementioned shortcomings and drawbacks encountered in the prior art.

Another object of the present invention resides in a shifting lever for vehicle transmissions which not only greatly increases the safety of the passengers against internal injuries when impinging against the shifting lever but also facilitates the operation of the vehicle.

A further object of the present invention resides in a shifting lever which is displaceable against the force of a compression spring after its connection is disengaged due to a passenger impact.

A still further object of the present invention resides in a center, floor-type shifting lever of the type described above which facilitates the movement of passengers across the vehicle front seats from one side of the vehicle to the other.

Figure 2:
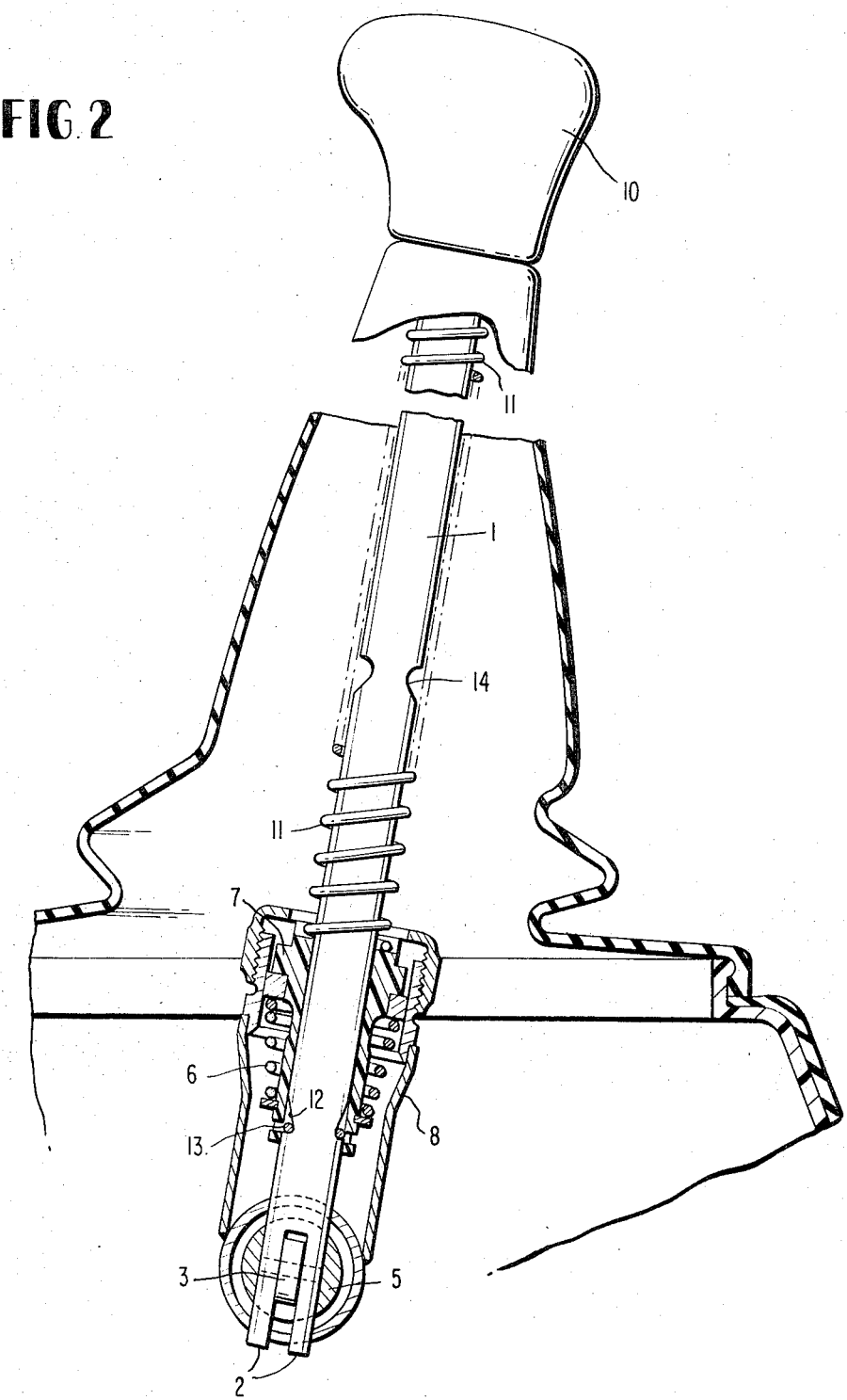

These and further objects, features and advantages of the present invention will become more apparent from the following description when taken in connection with the accompanying drawing which shows, for purposes of illustration only, one embodiment in accordance with the present invention, and wherein FIG. 1 is a cross-sectional view through a shifting lever arrangement in accordance with the present invention, taken in a vehicle cross plane, and FIG. 2 is a cross-sectional view through the shifting lever of FIG. 1, taken in a vehicle longitudinal plane.

Referring now to the drawing wherein like reference numerals are used throughout the two views to designate like parts, the shifting lever 1 made of a flat section or profile which is illustrated in the drawing, terminates at its lower end in a fork 2 in which a roller 3 is rotatably arranged that is able to roll off along the walls of a bore 4 in the shifting tube-guide pin 5. This rolling-off action occurs, for example, when the shifting lever 1 during the selection of the speed channels and when overcoming a reverse locking mechanism is raised against the force of a compression spring 6.

The shifting lever 1 is guided in a shifting lever guide means 7 consisting of plastic material such as synthetic resinous material of any suitable type, or of slide-bearing-metal; the shifting lever guide means 7 is thereby movable in a ball socket 9 which is retained in a shifting lever support 8.

A relatively soft compression spring 11 is arranged between the shifting lever guide means 7 and the handle portion 10 of the shifting lever 1 whereby a force dependent on the travel and lying, for example, between 0.5 and 5 kg is required for the compression thereof.

The shifting lever 1 is retained in its normal operating position by a hairpin shaped spring 13 engaging into notches or recesses 12, which is retained at the shifting lever guide means 7. Upon exceeding a predetermined pressure force exerted on the shifting lever 1, the spring 13 slides along the illustrated inclined surfaces out of the notches or indentations 12 and the shifting lever 1 can be displaced downwardly against the force of the compression spring 11 so far until the spring 13 engages in the notches or recesses 14 and the shifting lever 1 has thus reached its lower end position.

When a predetermined tensional force is then exerted on the shifting lever 1, the spring 13 slides over the illustrated inclined surfaces out of the notches 14 and the shifting lever 1 is brought back into its normal operating position by the compression spring 11.

Since the inserted shifting lever 1 facilitates the movement across the front seats to the other vehicle side, for example, for leaving the vehicle on the right-hand side in case of dense traffic in narrow streets (assuming a vehicle with the driver normally seated on the left-hand side), it offers increased comfort and will therefore be utilized more frequently than only in accident situations so that for maintaining the operating reliability thereof a protective plastic box 15 is provided for the protection against soiling.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A shifting lever arrangement for a motor vehicle transmission comprising, a shifting lever, means for supporting said shifting lever in the vehicle, means for connecting said shifting lever to the transmission during normal shifting operations and means for releasably securing said shifting lever in a normal extended operating position and in a retracted position.

2. A shifting arrangement according to claim 1, wherein said releasably securing means includes means for stopping the shifting lever in the retracted position.

3. A shifting lever arrangement according to claim 1, wherein said releasably securing means includes means for retaining the shifting lever in the retracted position.

4. A shifting lever arrangement according to claim 3, wherein said retaining means includes a spring engaging in notches provided in the shifting lever for retaining the shifting lever in its extended and retracted position.

5. A shifting lever arrangement according to claim 4, wherein said shifting lever is made of a flat section member.

6. A shifting lever arrangement according to claim 5, shifting lever is a center shifting lever arranged within the central area of the floor of the vehicle.

7. A shifting lever arrangement according to claim 1, wherein said shifting lever is made of a flat section member.

8. A shifting lever arrangement according to claim 1, wherein said shifting lever is a center shifting lever arranged within the central area of the floor of the vehicle.

9. A shifting lever arrangement according to claim 8, wherein said releasably securing means includes means for retaining the shifting lever in the retracted position.

10. A shifting lever arrangement according to claim 7, wherein said releasably securing means includes means for retaining the shifting lever in the retracted position.

11. A shifting lever arrangement according to claim 1 further comprising means for guiding said shifting lever into the extended and retracted position.

12. A shifting lever arrangement according to claim 11 wherein said releasably securing means includes a first and second compression spring disposed on opposite sides of said guiding means.

13. A shifting lever arrangement according to claim 12 wherein said supporting means is provided with a socket means for mounting and guiding means.

14. A shifting lever arrangement according to claim 13 wherein said guiding means is provided with a flange engageable with one end of said first compression spring, the other end of said first compression spring being engageable with said socket means.

15. A shifting lever arrangement according to claim 12 wherein said releasably securing means further includes hairpin shaped spring mounted in said guiding means and engageable with said shifting lever.

16. A shifting lever arrangement according to claim 15 wherein said releasably securing means further includes notches on said shifting lever, cooperating with said hairpin shaped spring, for retaining said shifting lever in the extended and retracted position.

17. A shifting lever arrangement according to claim 16 further comprising means for housing said shifting lever in the retracted position.

* * * * *